(12) United States Patent
Joo

(10) Patent No.: US 8,045,989 B2
(45) Date of Patent: Oct. 25, 2011

(54) METHOD AND APPARATUS FOR REDUCING THE NUMBER OF TIMES OF MEASUREMENTS FOR CELL RESELECTION IN MOBILE COMMUNICATION TERMINAL

(75) Inventor: Jung-Hoon Joo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 551 days.

(21) Appl. No.: 11/702,909

(22) Filed: Feb. 6, 2007

(65) Prior Publication Data
US 2007/0223510 A1 Sep. 27, 2007

(30) Foreign Application Priority Data
Feb. 6, 2006 (KR) .................. 10-2006-0011320

(51) Int. Cl.
*H04J 4/00* (2006.01)
(52) U.S. Cl. ........................ 455/446; 455/436
(58) Field of Classification Search ....... 455/435.1–466; 370/340–350
See application file for complete search history.

(56) References Cited

U.S. PATENT DOCUMENTS

| | | | |
|---|---|---|---|
| 2004/0043769 A1 * | 3/2004 | Amerga et al. | 455/436 |
| 2004/0082328 A1 * | 4/2004 | Japenga et al. | 455/436 |
| 2004/0202140 A1 * | 10/2004 | Kim et al. | 370/335 |

FOREIGN PATENT DOCUMENTS

| | | |
|---|---|---|
| EP | 1 107 630 | 6/2001 |
| KR | 1020050083260 | 8/2005 |
| KR | 1020050099369 | 10/2005 |
| KR | 1020060039749 | 5/2006 |
| KR | 1020060099462 | 9/2006 |
| WO | WO 01/31961 | 5/2001 |

OTHER PUBLICATIONS

3rd Generation Partnership Project; Technical Specification Group Radio Access Network; User Equipment (UE) procedures in idle mode and procedures for cell reselection in connected mode (Release 6); 3GPP TS 25.304 V6.8.0 (Dec. 2005).*
Universal Mobile Telecommunications System (UMTS); User Equipment (UE) Procedures in Idle Mode and Procedures for Cell Reselection in Connected Mode, Dec. 2005, pp. 1-39.

* cited by examiner

*Primary Examiner* — Kamran Afshar
*Assistant Examiner* — Kashif Siddiqui
(74) *Attorney, Agent, or Firm* — The Farrell Law Firm, P.C.

(57) ABSTRACT

Provided is a method and apparatus for reducing the number of times of measurements in a mobile communication terminal. According to the method, a signal receive level ("Srxlev") and a signal quality ("Squal") of a serving cell in an idle state are measured. When the serving-cell selection condition is not satisfied or an adjacent-cell measurement condition is satisfied as a result of the measurement, it is determined whether the number of times of cell reselections reaches a critical value. When the number of times of cell reselections reaches the critical value, the number of times of cell reselection is initialized to a value smaller than the critical value and the mobile terminal returns to an idle state. When the number of times of cell reselections does not reach the critical value, an adjacent-cell measurement for the cell reselection is performed. Therefore, unnecessary quiescent current consumption is reduced and a quiescent current performance is improved.

12 Claims, 3 Drawing Sheets

METHOD AND APPARATUS FOR REDUCING THE NUMBER OF TIMES OF MEASUREMENTS FOR CELL RESELECTION IN MOBILE COMMUNICATION TERMINAL

PRIORITY

This application claims priority under 35 U.S.C. §119 to an application filed in the Korean Intellectual Property Office on Feb. 6, 2006 and allocated Serial No. 2006-11320, the contents of which are incorporated herein by reference.

BACKGROUND OF THE INVENTION

1. Field of the Invention

The present invention relates generally to a mobile communication terminal, and more particularly, to a method and an apparatus for reducing the number of times of measurements for cell reselection.

2. Description of the Related Art

Generally, the 2nd generation (2G) mobile communication system providing voice-oriented service includes a Global System for Mobile Communications (GSM) and Interim Standard-95 (IS-95). The GSM has been commercialized in Europe in 1992 and provides service using Time Division Multiple Access (TDMA). IS-95 has been commercialized in Korea and the United States, and provides service using Code Division Multiple Access (CDMA).

Meanwhile, the 3rd Generation (3G) mobile communication system that has evolved from the 2G mobile communication system supports packet service as well as voice service using the CDMA system. The 3G mobile communication system includes a 3G Project Partnership (3GPP) or a wideband CDMA (WCDMA) system, which is an European and Japanese standard based on a synchronism between base stations, and 3GPP2 or a CDMA2000, which is an American standard based on synchronism between base stations. Here, the 3GPP proposes Frequency Division Duplexing (FDD) where upward/downward transmission and reception are discriminated using frequency in order to facilitate the efficient use of a limited channel, and Time Division Duplexing (TDD) where upward/downward transmission and reception are discriminated using time in order to facilitate the efficient use of a limited channel.

Meanwhile, one of the important characteristics of the 3G mobile communication system is to support global roaming service regardless of a communication standard or a frequency used in the 3G mobile communication system. Therefore, 3G mobile communication systems should support a handover to the 2G mobile communication systems or other 3G mobile communication systems. That is, in a mobile communication environment where different communication standards coexist as mobile communication systems by various communication standards are commercialized due to the development of communication technology, when a mobile terminal gets out of a current-serviced base station region and moves to another base station region that uses a different communication standard or a different frequency, the 3D mobile communication systems should support the handover between base stations supporting a different communication standard or a different frequency.

The handover includes an intra frequency handover which uses the same frequency and the same communication standard, an inter frequency handover between different frequencies, and an inter radio access technologies (RAT) handover.

First, the intra frequency handover is a handover between mobile communication systems that use the same frequency and the same communication standard. Referring to FIG. 1, a handover between cells 140 and 150 that use WCDMA standard and a frequency F1 corresponds to the intra frequency handover. Here, for the intra frequency handover, a mobile terminal performs an intra frequency measurement monitoring the state of a base station (a target base station) as an object for the handover.

The inter frequency handover is a handover between mobile communication systems that use different frequencies. In detail, the inter frequency handover means a handover for the case where base stations use different frequencies even though they belong to mobile communication systems using the same communication standard. Referring to FIG. 1, a handover between cell 110 that uses the WCDMA standard and a frequency F1 and cell 130 that uses the WCDMA standard and a frequency F2 corresponds to the inter frequency handover. Here, for the inter frequency handover, a mobile terminal performs an inter frequency measurement monitoring the state of a target base station.

Last, the inter-RAT handover is a handover between mobile communication systems that use different communication standards. Referring to FIG. 1, a handover between cell 110 that uses the WCDMA standard and a frequency F1 and cell 120 that uses a GSM standard corresponds to the inter-RAT handover. Here, for the inter-RAT handover, a mobile terminal performs an inter-RAT measurement monitoring a state of a target base station.

The handover is a technology that allows a system to measure the state of a terminal in communication and change the base station that will provide service to the terminal. During the handover, a mobile terminal that is in an idle state, not in communication, performs cell reselection. Here, cell reselection means a terminal normally camping on service migrates in search for a better cell according to a cell reselection reference. At this point, a value that can be used for the cell reselection reference may be a parameter value received from a network, and a mobile terminal determines the step to be actually performed according to the parameter value.

A conventional cell reselection process will be described below. A mobile terminal that is in an idle state wakes periodically to measure the signal receive level (Srxlev) and the signal quality (Squal) of a serving cell, and examines whether the measurement results satisfy a predetermined condition based on the parameter values. When the predetermined condition is satisfied, that is, a serving-cell selection condition is not satisfied or an adjacent-cell measurement condition is satisfied, the mobile terminal performs an adjacent-cell measurement for cell reselection, and determines ranking of adjacent cells using the measurement results. After that, when a highest ranking adjacent cell maintains a better state than the serving cell for a predetermined time, the mobile terminal migrates to the corresponding adjacent cell, thereby performing cell reselection. After that, when the mobile terminal normally camps on, the above process is repeated.

Here, the Srxlev and Squal of a serving cell that are measured by a mobile terminal can be measured using Received Signal Code Power (RSCP) or Signal-to-Noise Ratio (SNR). Generally, in the case of an FDD cell, the SNR value is used for a cell reselection reference. In the case of a TDD cell, the RSCP value is used for a cell reselection reference.

The serving-cell selection condition serves as a reference used for judging whether a serving cell is a selectable cell, that is, whether the serving cell satisfies a minimum condition required for providing service. The serving-cell selection condition has a different value depending on whether the serving cell is an FDD cell or a TDD cell. When the serving cell is an FDD cell, the serving-cell selection condition is Squal>0 and Srxlev>0. When the serving cell is a TDD cell, the serving-cell selection condition is Srxlev>0.

The parameter value received from the network includes data for adjacent cells of a serving cell in which the mobile terminal receives service. When the adjacent cells include a cell that uses the same frequency and the same communication standard as those of the serving cell, the data for the adjacent cells include Sintrasearch data for the intra frequency measurement. Also, when the adjacent cells include a cell of a frequency and a communication standard that are different from those of the serving cell, the data for the adjacent cells include Ssearch_rat-gsm data for the inter-RAT measurement. Also, when the adjacent cells include a cell of a frequency different from that of the serving cell, the data for the adjacent cells include Sintersearch data for the inter frequency measurement.

The adjacent-cell measurement condition based on the parameter value for cell reselection will be described below. In the case of the intra frequency measurement in the FDD cell, when Sintrasearch>Squal or the Sintrasearch data are not broadcasted periodically from the network, the mobile terminal performs the intra frequency measurement. In the case of the inter-RAT measurement, when Ssearch_rat-gsm>Squal or Ssearch_rat-gsm data are not broadcasted periodically from the network, the mobile terminal performs the inter frequency measurement.

Meanwhile, the conventional adjacent-cell measurement condition for cell reselection does not consider a pingpong phenomenon. That is, when a network broadcasts an inappropriate parameter due to an erroneous network design and values such as the Sintrasearch, Sintersearch, and Ssearch_rat_gsm are set excessively large compared to the Squal, or values such as the Sintrasearch, Sintersearch, and Ssearch_rat_gsm are not broadcasted, the mobile terminal performs an adjacent-cell measurement every time the mobile terminal wakes from an idle state. Accordingly, the mobile terminal that performs an adjacent-cell measurement consumes a large amount of quiescent current compared to a mobile terminal that does not perform the adjacent-cell measurement.

SUMMARY OF THE INVENTION

An object of the present invention is to substantially solve at least the above problems and/or disadvantages and to provide at least the advantages below. Accordingly, an object of the present invention is to provide a method and an apparatus for reducing the number of times of measurements for cell reselection in a mobile communication terminal.

Another object of the present invention is to provide a method and an apparatus for efficiently managing the number of times of adjacent cell measurements performed for cell reselection under an erroneously designed network and reducing the necessary number of times of measurements.

According to one aspect of the present invention, a method for reducing the number of times of measurements for cell reselection in a mobile communication terminal includes measuring a signal receive level ("Srxlev") and a signal quality ("Squal") of a serving cell in an idle state; when a serving-cell selection condition is not satisfied or an adjacent-cell measurement condition is satisfied as a result of the measurement, examining whether the number of times of cell reselections reaches a critical value; when the number of times f cell reselections reaches the critical value, initializing the number of times of cell reselections using a value smaller than the critical value and returning to an idle state; and when the number of times of cell reselections does not reach the critical value, performing an adjacent-cell measurement for the cell reselection.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, a method for reducing the frequency of measurements for cell reselection in a mobile communication terminal will be described in detail.

In the following description, the mobile communication terminal includes cellular phones, Personal Communication System (PCS) terminals, Personal Digital Assistants (PDAs), and International Mobile Telecommunication-2000 (IMT-2000) terminals. Description will be made using a general construction of such mobile terminals.

Figure 1:
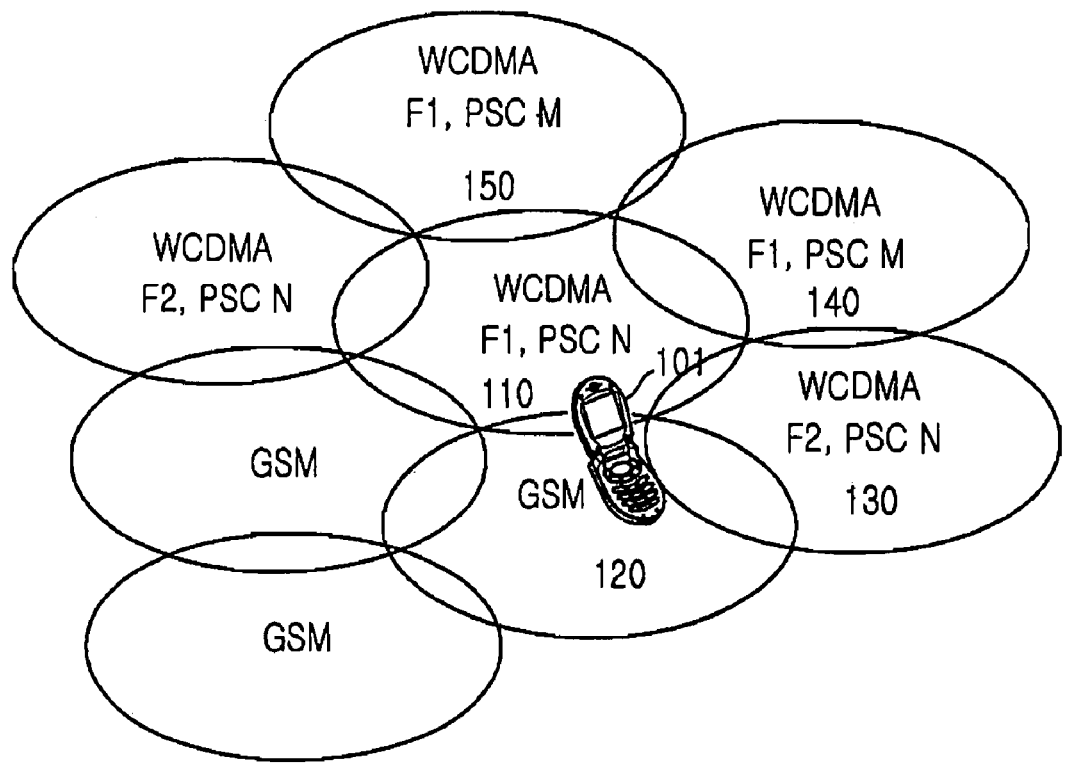
FIG. 1 shows a typical mobile communication system.
Figure 2:
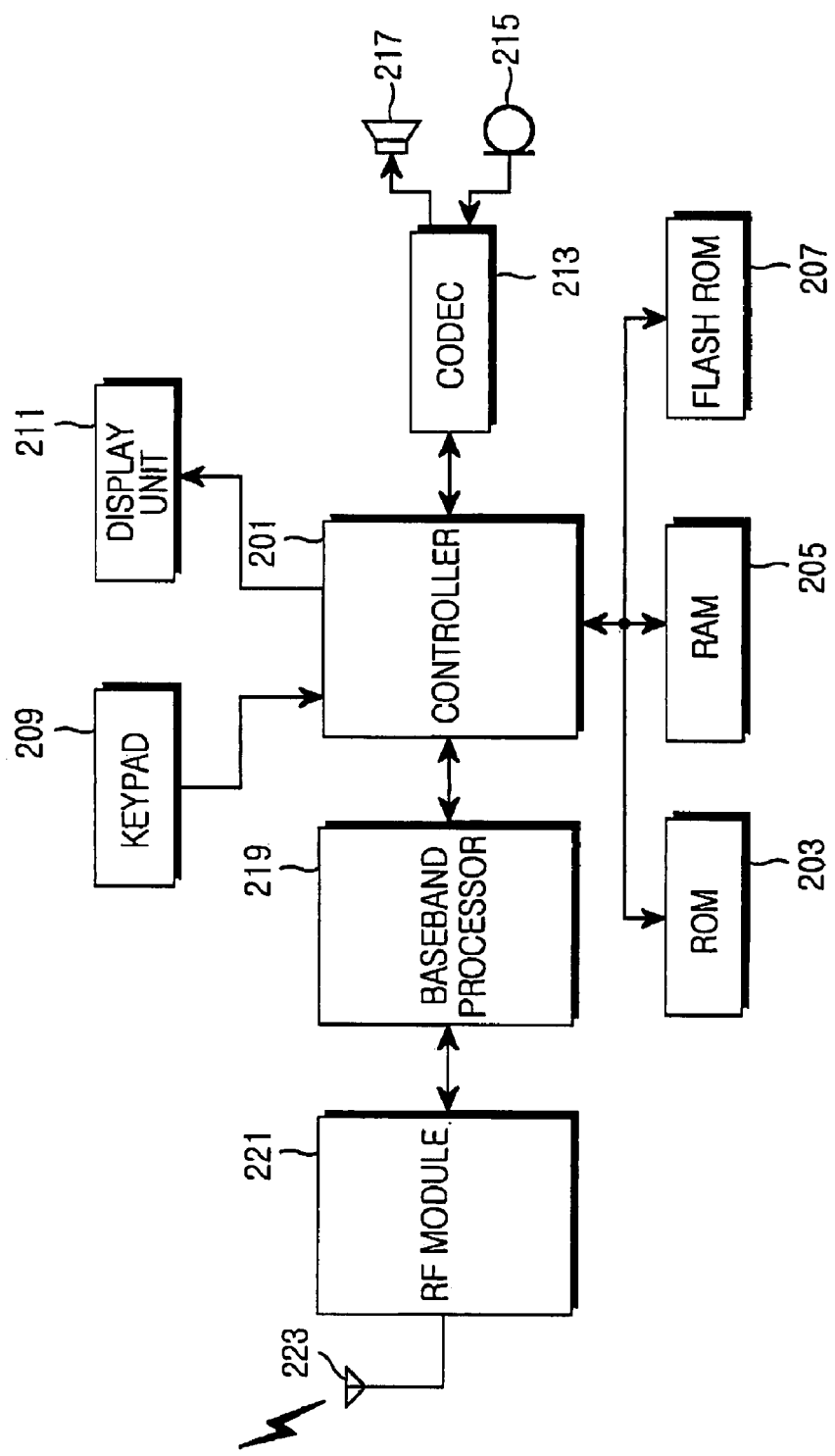
FIG. 2 is a block diagram of a mobile communication terminal according to the present invention.

Referring to FIG. 2, a controller (e.g., a microprocessor unit (MPU)) 201 controls overall steps of the mobile communication terminal. For example, the controller 201 may perform a process and control for voice communication and data communication. In addition to general functions, the controller 201 may perform a function for reducing the frequency of measurements for cell reselection in a predetermined region according to the present invention. Therefore, descriptions of general processes and controls by the controller 201 will be omitted.

A Read Only Memory (ROM) 203 stores microcodes of a program and a variety of reference data used for the processes and controls by the controller 201. Particularly, the ROM 203 stores a program for reducing the frequency of measurements for cell reselection in a predetermined region according to the present invention. A Random Access Memory (RAM) 205 is a working memory for the controller 201 and temporarily stores data generated during operations. A Flash ROM 207 stores a variety of updateable backup data.

A keypad 209 includes numeric keys of digits 0-9 and a plurality of function keys, such as a Menu key, a Cancel (Delete) key, a Confirmation key, a Talk key, an End key, an Internet Connection key, and Navigation keys (▲/▼/◀/▶) to provide key input data that corresponds to a key pressed by a user to the controller 201.

A display unit 211 displays status information generated during process execution steps, numerals and characters, moving pictures and still pictures. A color liquid crystal display (LCD) may be used for the display unit 211.

A CODEC 213 is connected to the controller 201, a microphone 215 and a speaker 217 are connected to the CODEC 213. The CODEC, the microphone 215, and the speaker 217 serve as an audio input/output block for telephone communication and voice recording. The CODEC 213 converts digital data produced by the controller 201 into analog audio signals to output the analog audio signals through the speaker 217, and converts audio signals received through the microphone 215 into digital data to provide the digital data to the controller 201.

An RF unit 221 down-converts an RF signal received through an antenna 223 to provide the down-converted signal to a baseband processor 219, and up-converts a baseband signal from the baseband processor 219 to transmit the up-converted signal through the antenna 223. The baseband processor 219 processes a baseband signal transmitted and received between the RF unit 221 and the controller 201. For example, during a transmission operation, the baseband processor 219 channel-codes and spreads data to be transmitted. During a reception operation, the baseband processor 219 despreads and channel-decodes a received signal.

Figure 3:
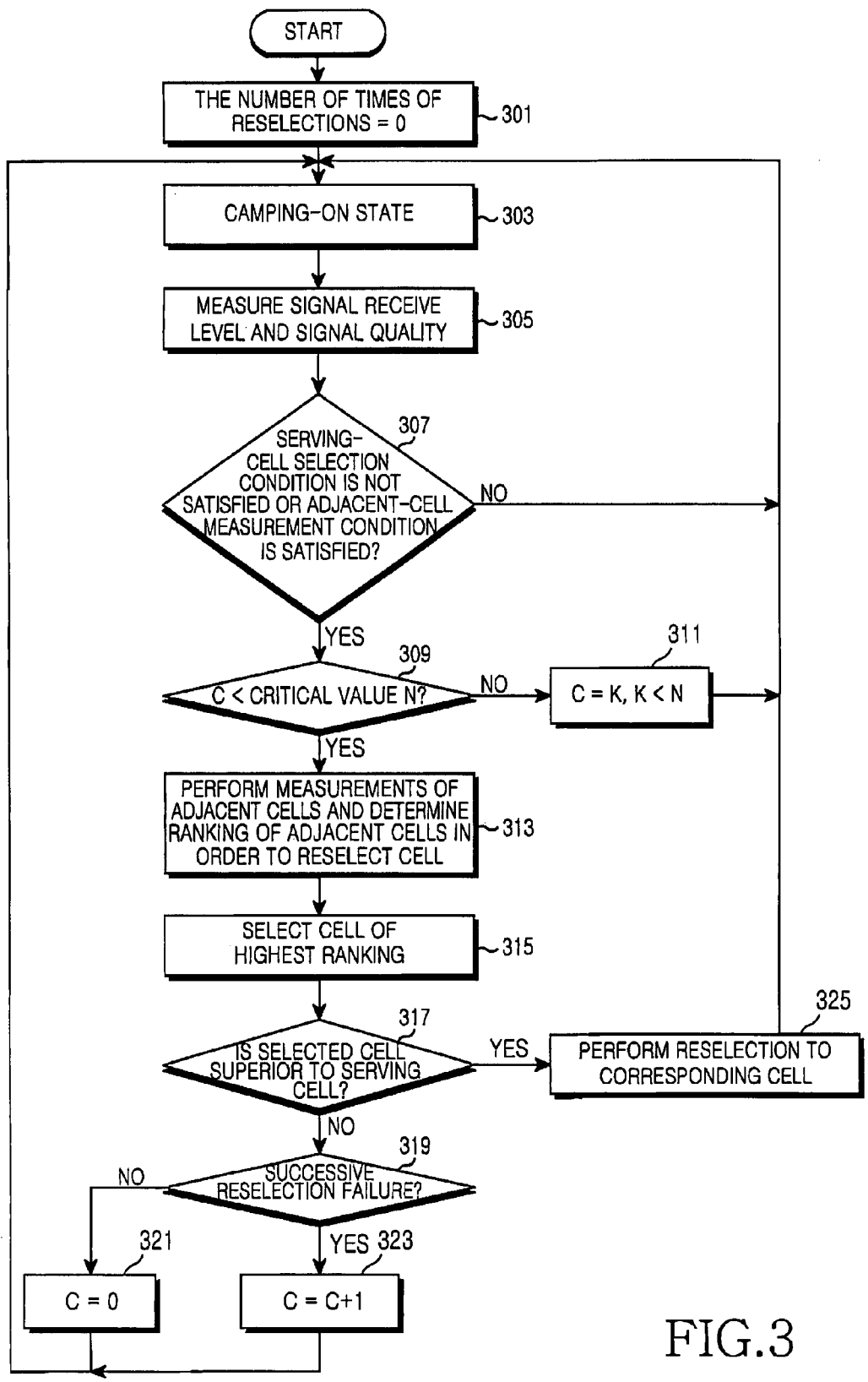
FIG. 3 is a flowchart illustrating a method for reducing the frequency of measurements for cell reselection in a mobile communication terminal according to the present invention.

Referring to FIG. 3, the controller 201 sets the number of times C of cell reselection to zero in a step 301 and performs step 303 to normally camp on service. After that, controller 201 checks the state of a serving cell by measuring Srxlev and Squal of the serving cell in step 305.

In step 307, controller 201 examines whether the measurement results does not satisfy a serving-cell selection condition, or satisfy a adjacent-cell measurement condition. Here, when the serving cell is an Frequency Division Duplexing (FDD) cell, the serving-cell selection condition is Squal>0 and Srxlev>0. When the serving cell is a Time Division Duplexing (TDD) cell, the serving-cell selection condition is Srxlev>0.

When a state of the serving cell does not satisfy the cell selection condition for M times of energy-saving mode cycles in succession, controller 201 can perform measurement of a relevant adjacent cell.

Here, the adjacent-cell measurement condition is adjacent cell data>Squal. The adjacent cell data is periodically received from a network. For example, the adjacent-cell measurement condition can be Sintrasearch>Squal, Sintersearch>Squal, or Ssearch_rat-gsm>Squal depending on the kind of adjacent cell. When the condition is not satisfied or the adjacent cell data is not received from the network, controller 201 can measure the relevant adjacent cell.

When the measurement results satisfy the serving-cell selection condition or the adjacent-cell measurement condition is not satisfied in step 307, that is, when Squal>0 and Srxlev>0, and adjacent cell data<Squal, controller 201 performs step 303 and maintains the camping-on state.

When the measurement results does not satisfy the serving-cell selection condition or the adjacent-cell measurement condition is satisfied in step 307, controller 201 performs step 309 to examine whether the number of times C of cell reselection is smaller than a critical value N. Here, N means a critical value of the frequency of successive cell reselection failures. When frequency C of cell reselection is not smaller than the critical value N, that is, when the number of times C of cell reselection reaches the critical value N, controller 201 initializes C to K that is smaller than the critical value N in step 311 and goes back to step 303 to maintain the camping-on state. Here, K can be set to 0. Also, K may be set to a value greater than 0 in order to more effectively reduce the number of times of adjacent cell measurements. When the number of times C of cell reselection is smaller than the critical value N, that is, when the number of times C of cell reselection does not reach the critical value N, controller 201 performs measurements of adjacent cells in order to reselect a cell in step 313, and determines the ranking list of the adjacent cells according to the measurement results.

After that, in step 315, controller 201 selects the highest ranking cell from the determined list and performs step 317 to examine whether the selected cell is a cell superior to the serving cell. Here, the superiority of the selected cell can be determined depending on whether the selected cell maintains a better state than the serving cell for a predetermined time.

When the selected cell is not superior to the serving cell in step 317, controller 201 determines that a cell to be reselected is not found, that is, determines a cell reselection failure, and performs step 319 to examine whether the cell reselection failure is a successive failure. When the cell reselection failure is the successive failure, controller 201 replaces the number of times C of cell reselection by a value obtained by adding 1 to the C, and goes back to step 303 to maintain the camping-on state. When the cell reselection failure is not the successive failure, the controller 201 resets the number of times C of cell reselection to 0, and goes back to step 303 to maintain the camping-on state.

When the selected cell is the superior cell to the serving cell in step 317, that is, when the selected cell maintains a better state than the serving cell for the predetermined time, controller 201 performs step 325 to migrate to the selected cell and goes back to step 303 to maintain the camping-on state.

For example, when Squal<Sintrasearch is always satisfied in a predetermined region due to an erroneous network design, a mobile terminal wakes from an idle state attempts to measure adjacent cells every second even though a signal receive level and signal quality of a current serving cell are not reduced to such a degree that needs cell reselection. In this case, a cell reselection failure occurs, and the mobile terminal increases the number of times of cell reselection failures by 1 and camps on an idle state again. After that, when the cell reselection failure successively occurs (N−1) times, the number of times of cell reselection failures reaches the critical value. The mobile terminal that has gotten out of the idle state directly enters the idle state without performing measurement of adjacent cells at an N-th time. At this point, the number of times of cell reselection failures is initialized to K. When a mobile terminal applying an algorithm according to the present invention is located in the predetermined region on the assumption that an idle state cycle of a mobile terminal is 1 second and K is set to 0, the mobile terminal performs t*3600 times of measurements per t-time or 3600 times a second. On the other hand, a terminal applying the algorithm of the present invention performs only t*3600*(N−1)/N times of measurements per t time. When the K is not 0, the terminal applying the algorithm of the present invention performs only t*3600*(N−K−1)/(N−K) times of measurement per t time to prevent unnecessary power consumption.

As described above, the present invention provides a method for effectively managing the number of times of adjacent cell measurements performed for cell reselection and reducing the number of times of unnecessary measurements in a mobile terminal. Therefore, even when the mobile terminal is located in a region where a network broadcasts inappropriate parameters due to erroneous network design or the parameters are not broadcasted, or a signal receive level and signal quality are low due to damage of an antenna and an inner structure of the mobile terminal, the mobile terminal does not perform measurements of adjacent cells every time the mobile terminal wakes from an idle state, so that unnecessary quiescent current consumption is reduced during an idle state and quiescent current performance can be improved.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A method for reducing a frequency of measurements for cell reselection in a mobile communication terminal, comprising the steps of:
   measuring a signal receive level ("Srxlev") and a signal quality ("Squal") of a serving cell in an idle state;
   when a serving-cell selection condition is not satisfied or an adjacent-cell measurement condition is satisfied as a result of the measurement, examining whether a number of times of cell reselections reaches a critical value;
   when the number of times of cell reselections reaches the critical value, initializing the number of times of cell reselection using a value smaller than the critical value and returning to an idle state;
   when the number of times of cell reselections does not reach the critical value, performing an adjacent-cell measurement for the cell reselection;
   determining a ranking of adjacent cells using a result of the adjacent-cell measurement and determining whether an adjacent cell of a highest ranking is superior to the serving cell;
   performing reselection of a corresponding cell and returning to the idle state when the adjacent cell of the highest ranking is the cell superior to the serving cell;
   determining that cell reselection has failed and examining whether the cell reselection failure is a successive failure when the adjacent cell of the highest ranking is not the cell superior to the serving cell;
   when the cell reselection failure is the successive failure, replacing the number of times of cell reselection by a value obtained by adding 1 to the number of cell reselection, and returning to the idle state; and
   when the cell reselection failure is not the successive failure, initializing the number of cell reselection to 0, and returning to the idle state.

2. The method of claim 1, wherein the serving-cell selection condition comprises one of Srxlev>0 and Squal>0.

3. The method of claim 1, wherein the adjacent-cell measurement condition comprises a measurement of adjacent-cell data>Squal.

4. The method of claim 3, wherein the measurement of the adjacent-cell data comprises one of relevant cell data for intra frequency measurement, relevant cell data for inter frequency measurement, relevant cell data for inter-radio access technologies (RAT) measurement, and the data are received from a network.

5. The method of claim 4, wherein the adjacent-cell measurement condition further comprises a case where the adjacent-cell data is not received from the network.

6. The method of claim 1, wherein the superiority of the adjacent cell is determined by examining whether the adjacent cell maintains a better state than the serving cell for a predetermined time.

7. A mobile communication terminal for reducing a frequency of measurements for cell reselection comprising:
   a controller for measuring a signal receive level ("Srxlev") and a signal quality ("Squat") of a serving cell in an idle state, examining whether the number of times of cell reselections reaches a critical value when a serving-cell selection condition is not satisfied or an adjacent-cell measurement condition is satisfied as a result of the measurement, initializing the number of times of cell reselection using a value smaller than the critical value and returning to an idle state when the number of times of cell reselections reaches the critical value, and performing an adjacent-cell measurement for the cell reselection when the number of times of cell reselections does not reach the critical value,
   wherein the controller further performs the steps of determining a ranking of adjacent cells using a result of the adjacent-cell measurement and determining whether an adjacent cell of a highest ranking is superior to the serving cell, performing reselection of a corresponding cell and returning to the idle state when the adjacent cell of the highest ranking is the cell superior to the serving cell, determining that cell reselection has failed and examining whether the cell reselection failure is a successive failure when the adjacent cell of the highest ranking is not the cell superior to the serving cell, replacing the number of times of cell reselection by a value obtained by adding 1 to the number of cell reselection when the cell reselection failure is the successive failure, and returning to the idle state, and initializing the number of cell reselection to 0 when the cell reselection failure is not the successive failure, and returning to the idle state.

8. The mobile communication terminal of claim 7, wherein the serving-cell selection condition comprises one of Srxlev>0 and Squal>0.

9. The mobile communication terminal of claim 8, wherein the adjacent-cell measurement condition comprises a measurement of adjacent-cell data>Squal.

10. The mobile communication terminal of claim 9, wherein the measurement of the adjacent-cell data comprises one of relevant cell data for intra frequency measurement, relevant cell data for inter frequency measurement, relevant cell data for inter-radio access technologies (RAT) measurement, and the data are received from a network.

11. The mobile communication terminal of claim 10, wherein the adjacent-cell measurement condition further comprises a case where the adjacent-cell data is not received from the network.

12. The mobile communication terminal of claim 7, wherein the superiority of the adjacent cell is determined by examining whether the adjacent cell maintains a better state than the serving cell for a predetermined time.

* * * * *